Patented June 20, 1939

2,162,971

UNITED STATES PATENT OFFICE 2,162,971

POLYCARBOXYLIC ACID AND PROCESS OF PREPARING THE SAME

Anderson W. Ralston, Chicago, Ill., assignor to Armour and Company, Chicago, Ill., a corporation of Illinois No Drawing. Application May 27, 1938, Serial No. 210,478

4 Claims. (Cl. 260—537)

This invention relates to aliphatic polycarboxylic acids and processes of preparing the same, and more particularly to those aliphatic polycarboxylic acids which result from the hydrolysis of polymerized aliphatic nitriles.

Aliphatic polycarboxylic acids, and by this I mean aliphatic compounds containing two or more carboxyl groups, are of great technical and scientific interest. Aliphatic dicarboxylic acids, such as azelaic acid, adipic acid, etc., can be condensed with polyhydroxy alcohols to give plastics. These dicarboxylic acids do not, however, occur abundantly in nature and their synthesis is difficult and costly. This fact has resulted in a limited use in the plastic and resin field in spite of the fact that resins prepared from these acids possess commercially important properties. The preparation of aliphatic polycarboxylic acids by a commercially feasible and cheap process is, therefore, of economic and technical interest.

In a previous application, Serial No. 92,943, filed July 27, 1936, I have shown that aliphatic nitriles, such as stearonitrile, oleonitrile, and others, can be polymerized in the presence of catalysts, such as aluminum chloride, to give products of high molecular weight. These products are either heavy oils or wax-like solids. I have found that the polymerization reaction does not destroy the nitrile group of the nitriles and that the products obtained are polynitriles. When unsaturated nitriles are polymerized condensation occurs at the olefinic bond and when saturated nitriles are polymerized there appears to be dehydrogenation followed by polymerization so that in either case polymers containing two or more nitrile groups result. This differs from polymerization of unsaturated acids, because the carboxyl group in such acids is not thermostable and is lost during polymerization by heat in the presence of catalysts.

I have now discovered that these polynitriles can be converted to polycarboxylic acids without undergoing depolymerization. The polycarboxylic acids I obtain thus contain the complex polymeric carbon chain of the polymerized nitriles, the only difference between the polynitriles and the polycarboxylic acids, structurally, being that the nitrile radicals are converted to carboxylic acid radicals.

In my former application, previously referred to, I stress the fact that polymerization catalysts are necessary. I now find that while in a number of instances they are highly advantageous they are not indispensable to the polymerization process.

As above stated, I have now found that these polymerized nitriles can be hydrolyzed to polycarboxylic acids without undergoing depolymerization. I have further found that these polycarboxylic acids which result from this process can be condensed with polyhydroxy alcohols, such as glycerol, to give plastics having valuable commercial properties. These plastics and their preparation are described and claimed in my copending application, Serial No. 210,517, filed of even date herewith.

In its broadest aspects my invention comprises products and processes wherein an aliphatic nitrile containing ten or more carbon atoms is polymerized either in the presence or absence of such catalysts as aluminum chloride, zinc chloride, sodium or sulfur to give polynitriles, and such polynitriles are then hydrolyzed to give polyacids having two or more carboxyl groups in the complex molecule.

The following examples illustrate my invention:

Example 1

About 133 parts by weight of oleonitrile are mixed with about 10 parts by weight of aluminum chloride and the mixture heated in an atmosphere of nitrogen for about three hours at a temperature of about 100° C., after which time the heating is continued for about six hours at 150° C. The resulting product, after removal of the aluminum chloride by filtration or centrifuging, is a heavy, light-colored oil. This product is then heated under twenty-five pounds steam pressure with an aqueous solution containing 40 parts of sodium hydroxide to convert the polymerized nitriles to sodium salts of the corresponding carboxylic acids. These are then salted out from the aqueous reaction mixture and separated therefrom by filtration or by decantation. The sodium salts to be converted to the free acids in the usual way with dilute mineral acids, such as hydrochloric.

Example 2

175 parts by weight of nitriles prepared from the fatty acids of linseed oil are heated in a three-necked flask in an atmosphere of nitrogen for four and one-half hours at 330° C. The original nitriles have an iodine number of 161 before heating and 86 after completion of the process. The product is a heavy, reddish-brown oil. 25 parts by weight of the polynitrile are placed in a steel bomb with 175 parts by volume of water and 20 parts by weight of sodium hydroxide. The mixture is heated at 165°–175° C. for two and one-half hours. The saponification mixture is then acidified with hydrochloric acid and heated. The resulting acids are decanted from the water and dissolved in ether. The ether solution is dried with anhydrous sodium sulfate and filtered. The ether is removed from the acids by distillation. The product is a mixture of polyacids having an iodine number of 85 and an acid value of 87% calculated upon the basis of linoleic acid. It is a reddish-brown, semi-crystalline product which condenses with glycerol in the presence of small amounts of sulfuric acid to give a resin.

Example 3

133 parts by weight of a mixture of palmito and stearonitriles are heated with 17 parts by weight of aluminum chloride for three hours at about 100° C. and then for nine hours at obout 175° C. The product is a heavy, reddish oil which is saponified by treatment with sodium hydroxide under pressure as described under Example 2. The polycarboxylic acids ultimately obtained by acidification of the caustic soda hydrolyzate, are a brownish, semi-crystalline solid which condenses with glycerol in the presence of a small amount of sulfuric acid to give a brown-colored plastic solid insoluble in water.

Example 4

150 parts by weight of oleonitrile are heated for three hours in the presence of 10 parts by weight of phosphorus. The resulting polymerized nitriles are then filtered while hot to remove the phosphorus sludge, and are then saponified and acidified as described under Example 2. The polyacids are a brown, semi-crystalline solid.

Example 5

150 parts of nitriles prepared from cottonseed oil fatty acids are polymerized in the presence of 5 parts by weight of aluminum sulfide by heating for 5 hours at 150° C. The aluminum sulfide sludge is then removed by filtration and the polymerized nitriles converted to polycarboxylic acids by heating with an aqueous solution of sodium hydroxide under pressure as described under Example 2. The acids are a semi-crystalline solid which condenses with glycerol to give a light brown plastic mass insoluble in water.

In the foregoing examples I have described advantageous ways of preparing polycarboxylic acids but I do not wish to be limited to the exact operating conditions stated. I have shown that nitriles can be polymerized by the use of heat, in the presence or absence of catalytic materials, to give polynitriles which can then be hydrolyzed to polyacids and that these polyacids can be condensed with polyhydroxy alcohols, such as glycerol, to give plastics.

It is understood that a modification of the time of heating or catalyst employed will result in products of somewhat different physical characteristics even when I use the same starting material. These polynitriles and polyacids result from polymerization at the olefinic bonds, or in the case of saturated acids by dehydrogenation followed by subsequent polymerization. Any nitrile containing ten or more carbon atoms can be advantageously used as a starting material. I can, for example, use such nitriles as lauronitrile, myristonitrile or mixtures of these nitriles with higher nitriles. Nitriles prepared from synthetic fatty acids, such as those obtained by the oxidation of paraffin, are also operative.

Since the polycarboxylic acids of the present invention have an unknown constitution, I am obliged to define my products with reference to the process of making them.

Having thus described my invention, what I claim is:

1. Aliphatic polycarboxylic acids resulting from the polymerization and hydrolysis of aliphatic nitriles, said nitriles having at least ten carbon atoms.

2. The polycarboxylic acids as described in claim 1 wherein the polymerized nitrile mixture is obtained by polymerizing aliphatic nitriles containing eighteen carbon atoms.

3. The process of preparing aliphatic polycarboxylic acids which comprises polymerizing aliphatic nitriles containing at least ten carbon atoms and hydrolyzing the resulting polynitriles to polycarboxylic acids.

4. The process as in claim 3 wherein the aliphatic nitriles have eighteen carbon atoms.

ANDERSON W. RALSTON.